Oct. 27, 1970    J. T. MULLER    3,535,912
APPARATUS FOR APPLYING SHOCK PULSES
Filed Dec. 12, 1968    4 Sheets-Sheet 1

INVENTOR
JOHN T. MULLER
BY Joshua Clapp
ATTORNEY

Oct. 27, 1970  J. T. MULLER  3,535,912
APPARATUS FOR APPLYING SHOCK PULSES
Filed Dec. 12, 1968  4 Sheets-Sheet 2
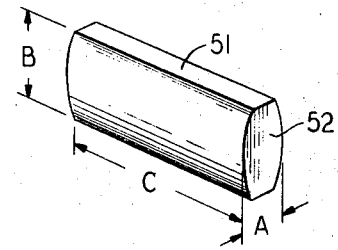
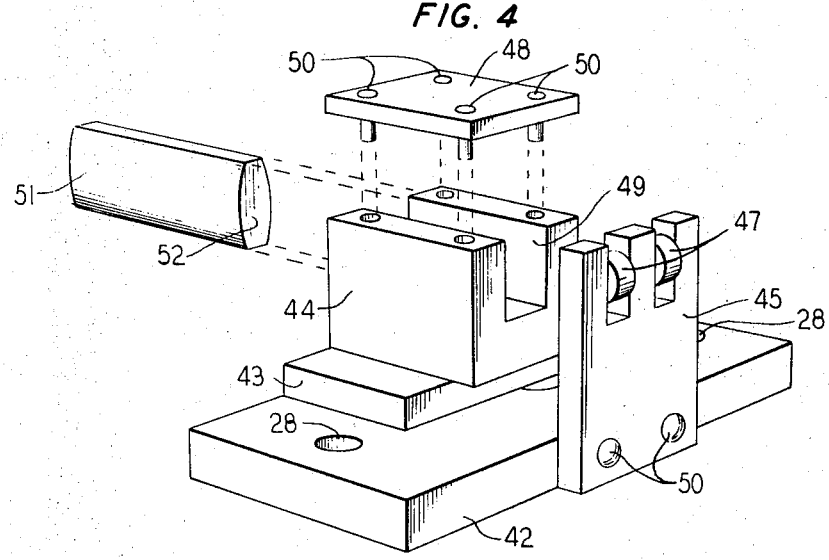
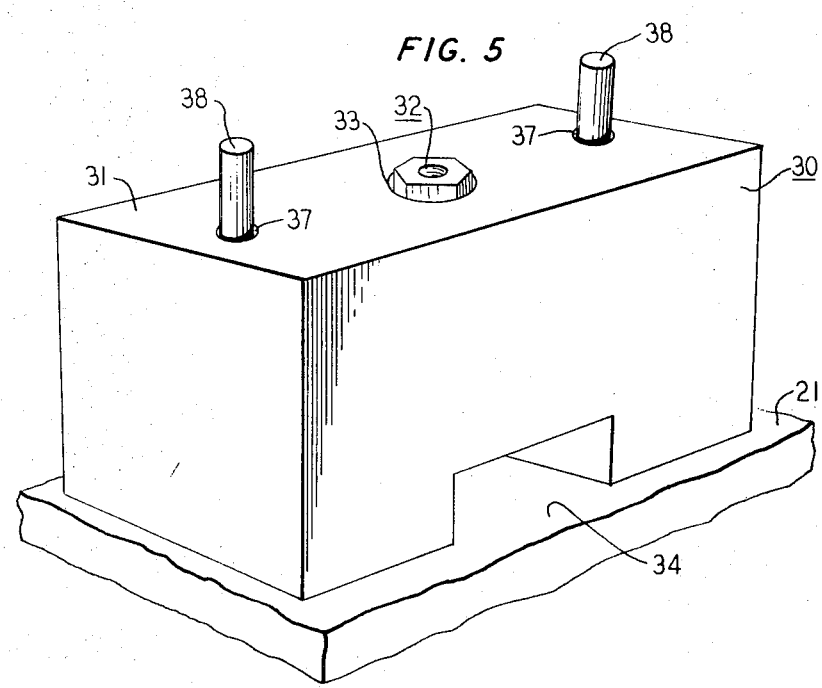

Oct. 27, 1970 J. T. MULLER 3,535,912
APPARATUS FOR APPLYING SHOCK PULSES
Filed Dec. 12, 1968 4 Sheets-Sheet 3

Oct. 27, 1970

J. T. MULLER 3,535,912

APPARATUS FOR APPLYING SHOCK PULSES

Filed Dec. 12, 1968

United States Patent Office 3,535,912
Patented Oct. 27, 1970

3,535,912
APPARATUS FOR APPLYING SHOCK PULSES
John T. Muller, Livingston, N.J. 07039
Filed Dec. 12, 1968, Ser. No. 783,349
Int. Cl. G01n 3/30
U.S. Cl. 73—12     10 Claims

ABSTRACT OF THE DISCLOSURE

A shock testing device is disclosed in which a knife and a deceleration bar adapted to be sliced by the knife are reciprocally mounted on a frame so as to be capable of slidable motion relative to each other.

BACKGROUND OF THE INVENTION

This invention relates to apparatus for applying shock pulses to equipment being tested for its ability to withstand mechanical stress and is particularly applicable to apparatus in which the shock pulses must be capable of precise regulation, easy application and ready duplication.

It is common knowledge that certain types of mechanical apparatus are susceptible to stress failure when installed in an operating environment without prior testing. The possibility of such failure, however, can be reduced, if not eliminated, by pre-testing the apparatus. Specifically, the apparatus can be subjected to environmental stresses before it is placed in operation, or in other words, it can be shock tested to determine whether or not it will fail when placed in service.

In rudimentary form, shock testing is performed simply by placing the apparatus to be tested in its actual intended environment and observing the results. Unfortunately, in many cases such a procedure destroys the environment; for example, an automobile crash.

Where the testing must be repetitive, i.e., where the test object is an accessory, it is obviously not feasible to destroy the environment for every test. Consequently, it is necessary to have laboratory equipment which can duplicate the test conditions without being destroyed.

Accordingly, one object of this invention is to provide laboratory test equipment which will not be destroyed during shock testing.

It is, however, not enough that the test equipment survive the test. The equipment must also simulate as closely as possible the stresses which will be experienced by the apparatus under test in its actual operating environment. Heretofore, shock testing equipment only roughly approximated actual conditions. That is, it was assumed that the actual shock pulse which would be experienced under actual conditions would have the contour of a sine curve.

By making this assumption, specifications for laboratory shock testing could be stated simply in terms of peak force value, or its equivalent acceleration or "g's," and a time interval within which the entire pulse must occur. In practice, however, the contour of the shock pulse is seldom a true sine curve. In fact, more often than not, it is quite irregular. Thus, the results produced by such equipment reflect only an average of the forces which act during the time interval of the shock pulse. While such results are broadly useful, there are many occasions in which more accurate data is required.

It is, therefore, another object of this invention to increase the fidelity between the contour of artificially created shock pulses and the contour of shock pulses which occur in an actual working environment.

While accurate and faithful reproduction of actual conditions is desirable, if not essential, such a result must also be capable of achievement by apparatus of relatively modest expense in order to be broadly useful. Moreover, in addition to being inexpensive, such apparatus must also be reliable as well as readily adjustable so as to be able to simulate a variety of conditions.

Accordingly, it is another object of this invention to achieve accurate shock test results at a relatively low cost, in a manner capable of consistent repetition and in a manner which can readily be adjusted to simulate a variety of conditions.

SUMMARY OF THE INVENTION

The foregoing objects of this invention, as well as others not specifically set forth, are achieved in accordance with a preferred embodiment of this invention in which apparatus for applying a shock pulse to a test specimen during a predetermined time interval is regulated by a knife, a deceleration bar for transmitting shock impulses to the test specimen when sliced by the knife and apparatus for impelling the knife through the deceleration bar with a slicing action.

In accordance with one feature of this invention, the cross-section of the deceleration bar has a predetermined cross-sectional configuration whereby the magnitude of the shock pulse transmitted when the knife slices therethrough will vary in proportion to the contour of the configuration and thus can be made to duplicate the force variation of an actual environmental shock pulse.

The detailed description set forth below will help in better understanding this invention, particularly when taken in conjunction with the drawing.

DESCRIPTION OF THE DRAWING

FIG. 3 is a perspective view of a deceleration bar.

FIG. 4 is a perspective view of a control assembly.

FIG. 5 is a partial view taken in perspective of a spacer assembly.

DETAILED DESCRIPTION OF THE INVENTION

Figure 8:
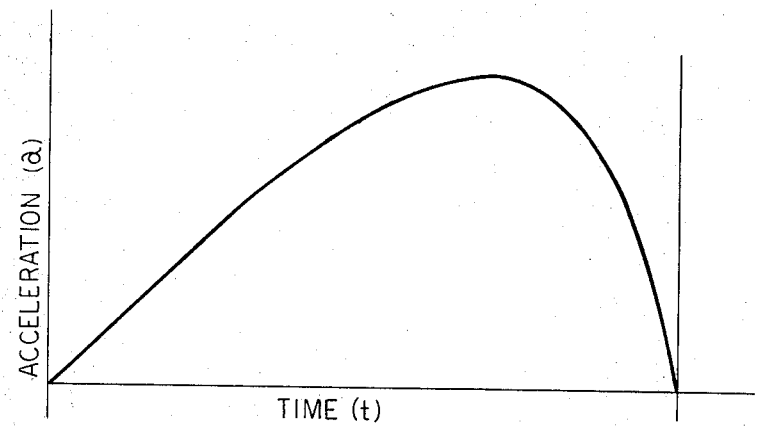
FIG. 8 is a plot of acceleration versus time and illustrates the contour of a specific shock pulse.

Before turning to a detailed description of the mechanics of the invention, a brief explanation of the nature of shock will be helpful. To begin, shock is transient motion during a time interval. The transient motion, however, is produced by force. As a result, shock is generally defined in terms of impulse, that is, force or its equivalent, acceleration, as a function of time as illustrated in FIG. 8.

Figure 9:
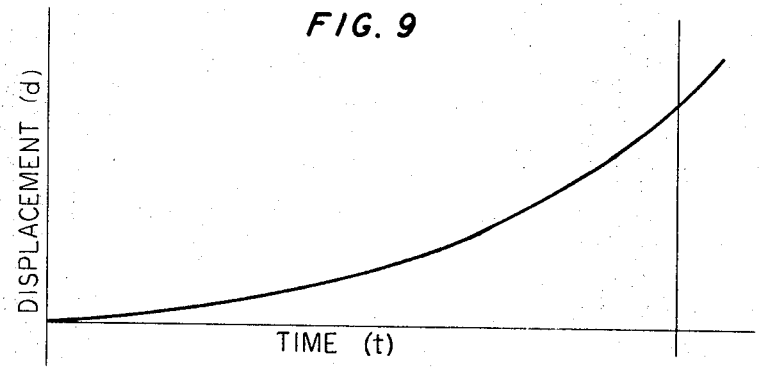
FIG. 9 is a plot of displacement versus time and represents the displacement curve for the shock pulse plotted in FIG. 8.

Acceleration, however, is also mathematically the second derivative of displacement. Thus, the pulse illustrated in FIG. 8 in terms of acceleration can also be expressed in terms of displacement as illustrated in FIG. 9.

In this invention, displacement, rather than force, is the parameter used to control the contour of artificially produced shock pulses. To illustrate, first a plot of acceleration or force versus time of an actual shock pulse is obtained; for example, by destructive test. Next, a curve having a known mathematical equation is fitted to the force-time plot by conventional curve fitting techniques. Finally, a displacement curve is obtained mathematically by twice integrating the force curve equation with respect to time. With the displacement curve known, the contour of the original shock pulse can then be substantially reproduced simply by producing a series of connected incremental displacements which simulate the mathematically derived displacement curve. According to a particularly significant aspect of this invention, consecutive increments of displacement are produced by the interaction of a knife and a deceleration bar in the shock testing apparatus 10 illustrated in FIG. 1.

Figure 1:
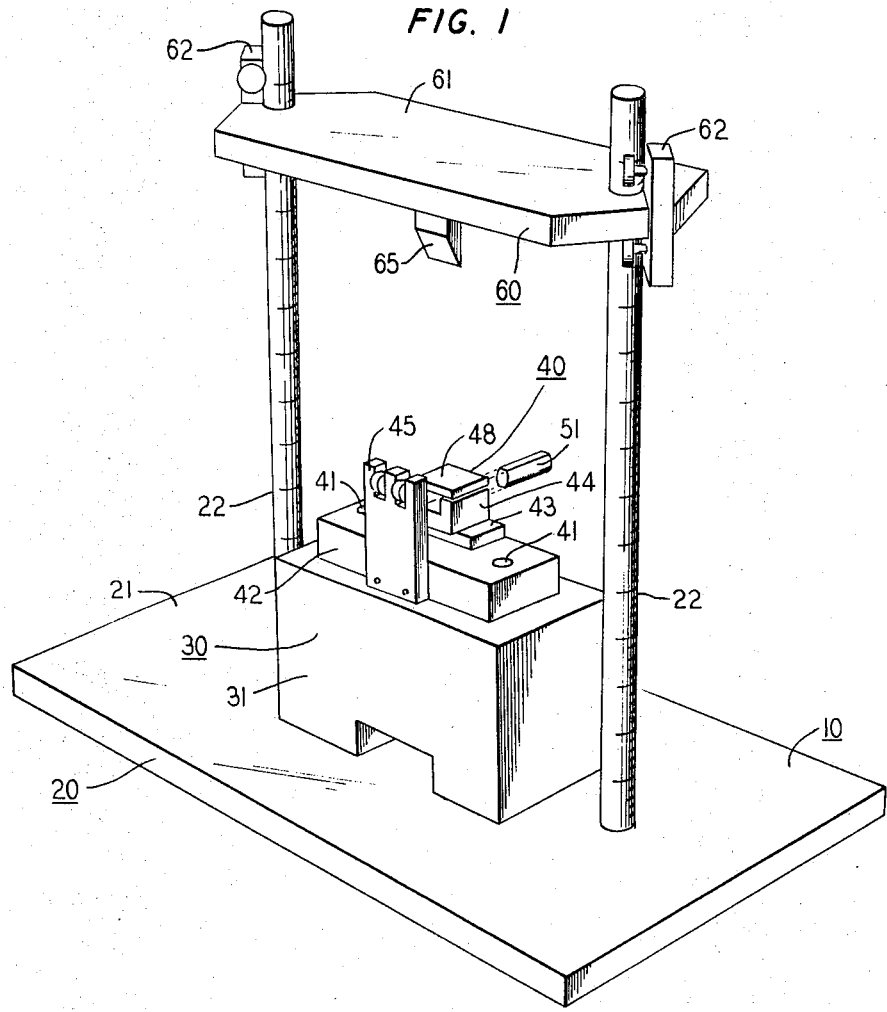
FIG. 1 is a perspective view of one embodiment of this invention in which the knife blade is poised above a control assembly prior to being dropped into percussive engagement with a deceleration bar.

Turning now to FIG. 1, the shock testing apparatus 10 comprises a frame assembly 20, a spacer assembly 30, a control assembly 40 and a table assembly 60. In the following paragraphs, each of these assemblies is described in detail.

Figure 10:
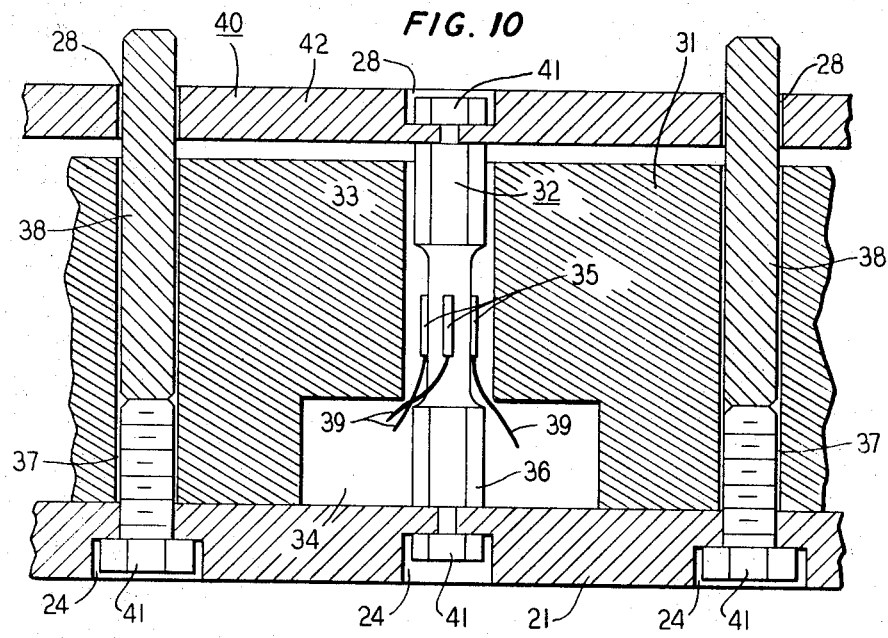
FIG. 10 is an elevation view of a portion of the embodiment shown in FIG. 1 with portions broken away to show interior details.

Beginning with the frame assembly 20, it comprises a base 21, and a pair of tracking rods 22. The base 21 is conveniently rectangular in shape, made of steel and, as seen in FIG. 10, includes several bolt holes 24. The tracking rods 22 are rigid, conveniently graduated, mounted on the base 21 parallel to each other and conveniently shaped in the form of cylindrical columns.

The purpose of the base 21 is to support the spacer assembly 30, the control assembly 40 and a load cell 32 described in detail elsewhere. The tracking rods 22 indicate the height of the table assembly 60 and guide it as it travels up and down.

Turning next to the spacer assembly 30, it includes, as shown in FIG. 5, a spacer block 31 and the load cell 32. The spacer block 31 is a relatively massive block made of steel. It has an aperture 33 for accommodating the load cell 32, an opening 34, two holes 37 for accommodating two dowels 38 and rests on the base 21. As shown in FIG. 10, two bolts 41 extend through the holes 24 and screw into the holes 37 to hold the spacer block 31 firmly against the base 21.

As best seen in FIG. 10, the load cell 32 comprises several strain gauges 35 and a steel bar 36 having a cylindrical central portion and two hexagonal tapped ends. The strain gauges 35 are symmetrically spaced around the outside diameter of the steel bar 36 and are connected by the wires 39 to a suitable display device such as an oscilloscope. In conjunction with a switch (not shown), the strain gauges 35 produce a signal which is proportional to each shock pulse generated when the shock testing apparatus 10 is operated. One end of the steel bar 36 is rigidly attached to a base plate 42 desscribed below, while the other end is rigidly attached to the base 21.

In the structure disclosed, the hexagonal ends facilitate the bolding of the load cell 32 in place. Specifically, as shown in FIG. 10, the bar 36 is held in place by two bolts 41 which advantageously have Allen heads. After the bar 36 has been installed in the spacer block 31 and the bolts 41 have been screwed into place in the tapped ends, a wrench can be inserted through the opening 34 in the spacer block 31 and applied to the hexagonal shaft to hold it still as the bolts 41 are finally tightened. As illustrated in FIG. 10, the load cell 32 extends slightly above the surface of the spacer block 31. Consequently, the spacing between the base block 42 and the spacer block 31 can be held to very close tolerances, i.e., in the order of 25 mils. Thus, dirt or other debris is prevented from settling between the spacer block 31 and the base plate 42 and interfering with the interaction between the load cell 32 and the base plate 42.

The control assembly 40, as shown in FIG. 4, includes the base plate 42, an intermediate block 43, a slicing die 44 and a guide plate 45. The base plate 42 is a block made of steel and, as best seen in FIG. 10, includes several holes 28. When the base plate 42 is assembled in place, the holes 28 and 37 are in register, it is rigidly joined to the top of the load cell 32 by a bolt 41 and laterally aligned with respect to the spacer block 31 by the dowels 38. The intermediate block 43, in turn, is attached to both the base plate 42 and the slicing die 44. Both the intermediate block 43 and the slicing die 44 are made of steel, are rigidly joined to each other and to the base plate 42 by screws (not shown) and are separated from the guide plate 45 by a space.

Figure 6:
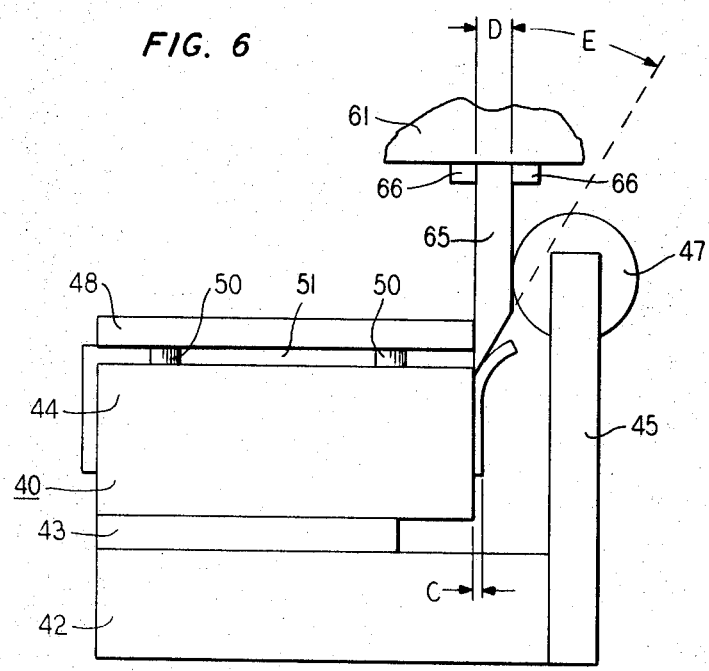
FIG. 6 is an elevation view of the control assembly cooperating with the knife.

The guide plate 45 is conveniently rectangular, is made of steel and includes a set of steel rollers 47. It is joined to the base plate 42 by a pair of screws 50 and, as shown in FIG. 6, the rollers 47 cooperate with the slicing die 44 to form an operating slot which accommodates a knife 65.

The slicing die 44, as shown in FIG. 4, includes a steel clamping cover 48 and a keyway 49. As shown in FIGS. 4 and 6 the clamping cover 48 is joined to the slicing die 44 and over the keyway 49 by several screws 50. The clamping cover 48 and the keyway 49 accept and hold in place a deceleration bar 51 such as the one illustrated in FIG. 3. The keyway 49, however, is made wide enough so that the deceleration bar 51 can be slightly cocked, if desired, so that one edge is higher than the other.

As shown in FIG. 3, the deceleration bar 51 has a width A, a height B and a length C. The width A has a contoured cross-section 52. In the embodiment described, the contour of the cross-section 52 is formed by two parallel ends which join two outwardly curved edges. While only one specific contour has been shown, it will be appreciated that others can be used as well for reasons to be described hereafter. Briefly, however, the contour of the cross-section, in conjunction with the thickness of cut and hardness of material, is the agency by which the shock testing apparatus 10 controls the shape of the shock pulses.

Figure 2:
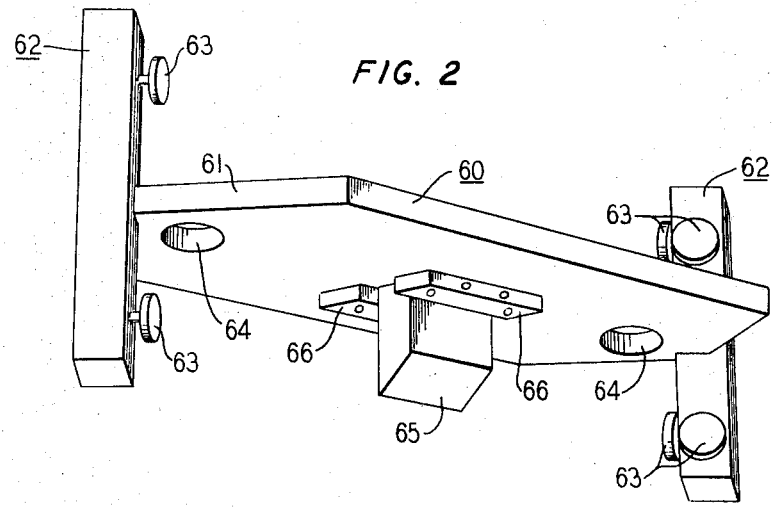
FIG. 2 is a perspective view of a table assembly showing details of the knife blade.
Figure 7:
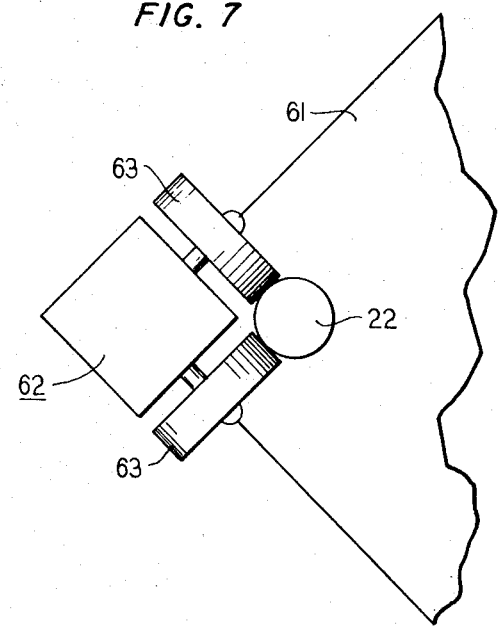
FIG. 7 is a partial plan view of one end of the table assembly and illustrates a guide support.

Turning finally to the table assembly 60, it comprises, as best seen in FIG. 2, a flat semi-rectangular platform 61, two guide supports 62 mounted at opposite ends of the platform 61, and the knife 65. As can be seen in FIG. 7, each guide support 62 is conveniently rectangular and is joined to a notch in the platform 61 by a longitudinal edge.

Each guide support 62 is made of steel and includes two pairs of nylon rollers 63. As seen in FIG. 7, the rollers in each pair are mounted on opposite sides of their associated guide support 62 so as to form a pocket for accommodating a tracking rod 22. In operation, the rollers 63 roll up and down the tracking rods 22 so as to permit free movement of the table assembly 60 while keeping it firmly aligned.

The platform 61, as shown in FIG. 2, includes two holes 64 and the bottom surface supports the knife 65. The two holes 64, as can be seen from FIGS. 1 and 7, are positioned to acommodate the two tracking rods 22.

As shown in FIG. 6, the knife 65 projects downwardly from the platform 61, has a thickness D and one end terminates in a beveled cutting edge having an angle E. The other end is attached to the platform 61 and held in place by a pair of cleats 66.

Advantageously, the platform 61 is made of steel and the knife 65 is made of hardened tool steel. For manufacturing efficiencies, however, the platform 61 may also be cast from aluminum, magnesium or other similar metal. While not shown, the upper surface of the platform 61 is arranged in a standard manner to support test specimens and to hold them in place during operation of the shock testing apparatus 10.

Operation of the embodiment of the shock testing apparatus 10 is relatively uncomplicated. Briefly, a specimen is mounted on the platform 61, the table assembly 60 is raised to a predetermined height on the tracking rods 22 and then dropped to let the knife 65 slice the deceleration bar 51. As the knife 65 slices the deceleration bar 51, reactive forces having a magnitude proportional to the contour of the cross-section 52 are developed and applied to the specimen under test thereby subjecting it to a shock pulse of desired contour. As a precaution against possible ringing effects, it is desirable to arrange for the knife 65 initially to engage an edge on the deceleration bar 51 instead of a flat surface.

The total reactive force applied during the period in which the knife 65 slices the deceleration bar 51 is the total shock pulse sustained by the test specimen. The total reactive force, however, is merely the sum of a series of consecutive incremental reactive forces. Thus, by shaping the incremental forces, and then joining them consecutively, a total reactive force, or total shock pulse, of specific contour is created.

More particularly, a shock pulse is contoured by recognizing that each incremental force in the total force is proportional to the amount of cross-sectional material in the deceleration bar 51 being sliced by the knife 65 in a given increment of time. Consequently, by varying the material being sliced by the knife 65, incremental forces having different magnitudes can be generated in sequence. For example, when the cross-sectional contour of the cross-section 52 is as illustrated herein, the shape of the resulting total shock impulse curve will be sinusoidal. Clearly, however, other contours will produce other shapes; i.e., a rectangular cross-section will produce a square pulse, a triangular cross-section will produce a parabolic pulse, etc.

Also, the particular shape can be controlled by adjusting the hardness of the material from which the deceleration bar 51 is made or by adjusting the amount C that it projects from the slicing die 44. For example, if a high intensity pulse is desired, it can be acquired by making the material of the deceleration bar 51 harder, increasing the dimension C, or by some combination of the two. In short, therefore, by carefully tailoring specific characteristics of the deceleration bar 51, a shock pulse of any desired contour is readily obtained.

Where the shock pulse to be reproduced is random, it is more convenient to regulate displacement rather than force. For example, the random shock pulse shown in FIG. 8 can easily be reproduced from its displacement curve. Specifically, the displacement curve is first divided into increments and a deceleration bar 51 is formed with a hardness and cross-section 52 contoured to reproduce, in the movement of the knife 65, as it slices the deceleration bar 51, appropriate increments of displacement.

In practice, it is a relatively simple matter to create any desired shock pulse with a minimum of experimentation. Since the area under the curve in FIG. 8 is the total change in velocity experienced by the specimen being tested and since the velocity is zero after the test is complete, the area under the curve in FIG. 8 is the exact velocity which the table assembly 60 must have when the knife 65 first starts to slice the deceleration bar 51. Thereafter, it is a simple matter to contour the cross-section of a particular deceleration bar 51 so that the knife 65 will follow the displacement curve shown in FIG. 9.

In a specific embodiment which has proved effective, the cross-section 52 of the deceleration bar 51 is substantially a rectangle, approximately one inch high and one-eighth of an inch wide. Further, it is positioned in the key block 44, as shown in FIG. 6, so that it projects outwardly into the path of the knife 65 about one-sixteenth of an inch. The following table establishes useful parameters for the various components which have worked well in practice.

PARAMETERS

Maximum g-seconds (ft./sec.) _____ .372.
Test specimen weight (lbs.) _____ 10.
Weight of drop table assembly (lbs.) ___ 10.
Deceleration bar material _____ Lead, aluminum.
Dimensions:
  A (inch) _____ 1/8.
  B (inch) _____ 3/4.
  C (inch) _____ 1/32–1/8.
  D (inch) _____ 1/4.
  E (degrees) _____ 30–45.

As mentioned above, the contour of the shock pulse generated by the shock testing apparatus 10 is readily displayed, as for example on an oscilloscope, in response to cooperation between the load cell 32 and a switch (not shown). Specifically, as the knife 65 initially engages the end of the deceleration bar 51, two events occur: first, the switch (not shown) is activated to close a circuit between a suitable display device and the load cell 32, and second, the load cell 32 begins to compress. As the load cell 32 compresses, which it does when the base plate 42 responds to pressure by the knife 65 slicing the deceleration bar 51, the strain gauges 35 generate a voltage in a known manner which is proportional to the instantaneous force being generated. Thus, the display device will trace out the contour of the total shock pulse. Furthermore, since the table mass can easily be determined, it is a simple matter to convert the data on the display device into terms of deceleration.

An especially important advantage of the particular design disclosed is that spurious increments of shock pulse due ot ringing or vibration of the various assemblies is minimized. Specifically, because the knife 65 and the deceleration bar 51 are in continuous contact all during the period in which the shock pulse is being generated, all parts of the shock testing apparatus 10 are held together. Thus, even if some vibration or ringing occurs, it will be heavily damped.

In addition to shock testing, the disclosed apparatus is particularly useful in calibrating accelerometers. Heretofore, when calibrating an accelerometer by subjecting it to a shock pulse, it has been quite difficult to reproduce the applied shock pulse for comparison purposes. When the calibration test is performed with the disclosed apparatus, however, the contour of the applied shock pulse appears on the recording instrument, i.e., an oscilloscope. Although the display is in terms of force, it is readily converted into terms of deceleration, as indicated earlier, simply by dividing the force data by the table mass. Thus, by superimposing the output of the accelerometer over the converted output of the load cell 32, a comparison of deceleration readings is simply, easily and simultaneously obtained.

Finally, calibration of the shock testing apparatus 10 itself is extremely easy. Specifically, a force is applied by the knife 65 to the load cell 32 through a compression type force gauge. From the readings on the force gauge, the oscillograph or other measuring device is easily calibrated.

In summary, a simple but readily adjustable shock testing apparatus capable of consistent repetitions and not destroyed during test has been disclosed which increases the fidelity between artificially produced shock pulses and actual shock pulses. While only one embodiment is shown, it is to be recognized that it is only illustrative of the principles of the invention and many embodiments which fall within the ambit of the invention will occur to those skilled in the art.

What I claim is:

1. In apparatus for subjecting a specimen to shock testing including specimen support means, applying means for applying a shock pulse to said specimen during a pre-determined time interval in response to relative movement between said applying means and said specimen support means, the improvement comprising means for regulating the shape of said shock pulse during said pre-determined time interval, said means including a deceleration bar, a knife mounted on said support means for generating said shock pulse when percussively engaging said deceleration bar with a slicing action and means for bringing said knife and said deceleration bar into percussive engagement, said deceleration bar having a contoured cross-section whereby the shape of said shock pulse generated by said knife varies in proportion to the contour of said cross-section.

2. Apparatus in accordance with claim 1 wherein said knife has a cutting edge beveled to an angle in the range of 30 to 45 degrees and said deceleration bar is made of a soft metal and has a cross-section approximately one-eighth inch thick and one inch high.

3. Apparatus in accordance with claim 2 wherein said angle is 37½ degrees.

4. In apparatus for subjecting specimens to shock testing, the combination comprising:
   a frame;
   a first support member mounted on one end of said frame;
   a second support member mounted on the other end of said frame, said first and second support members being capable of relative movement on said frame with respect to each other;
   holding means for accomodating objects to be shock tested, said holding means being attached to one of said support members;
   a deceleration bar for imparting a shock pulse to said holding means when sliced in cross-section, said deceleration bar being joined to one of said support members and having a contoured cross-section for regulating the shape of said shock pulse;
   a knife for cross-sectionally slicing said deceleration bar in response to relative movement between said first and second support members and for initially engaging said deceleration bar when the relative velocity between said first and second support members reaches a pre-determined magnitude, said knife being joined to the other of said support members; and
   means for establishing a relative velocity between said first and second support members.

5. The combination in accordance with claim 4 wherein said knife has a cutting edge beveled to an angle in the range of 30 to 45 degrees and said deceleration bar is made of soft metal such as lead, copper and aluminum.

6. The combination in accordance with claim 5 wherein said angle is 37½ degrees.

7. Apparatus for subjecting an object to shock testing comprising;
   a table assembly for carrying said object and for propelling a knife through the cross-section of a deceleration bar with a slicing action, said table assembly including said knife, a platform for supporting said object and guide means for guiding said platform through reciprocal motion, said knife being attached to one side of said platform and said guide means being joined to opposite ends of said platform and including roller means;
   a frame assembly for transmitting reactive forces to said table assembly, said frame assembly including support means and tracking means for accommodating said guide means, said tracking means including a pair of elongated rods attached at one end to said support means, being disposed in parallel upright relationship to each other and in engagement with said roller means;
   a spacer assembly for locating other assemblies with respect to each other, said spacer assembly being located on said frame assembly between said rods and including a spacer block mounted on said support means; and
   a control assembly for regulating the amount of reactive force said frame assembly transmits to said table assembly, said control assembly including said deceleration bar and clamping means for locating said deceleration bar in the path of said knife, said clamping means being mounted on said spacer block and said deceleration bar having a precontoured cross-section whereby the reactive force which is generated by said knife as it slices through said deceleration bar and which is transmitted by said frame assembly to said object varies in proportion to the cross-sectional contour of said deceleration bar.

8. The combination in accordance with claim 7 wherein said control assembly and said spacer assembly are joined to each other by removable dowels whereby lateral movement between said assemblies is restrained.

9. The combination in accordance with claim 7 wherein said control assembly includes a guide member having rollers at one end for guiding said knife into a slot containing a portion of said deceleration bar.

10. The combination in accordance with claim 7 wherein said guide means comprises at least one rectangular block joined by one longitudinal edge to said platform and said roller means comprises at least two pairs of rollers, one pair of rollers being mounted at each end of said block on opposite sides of said platform with the rollers in each pair projecting outwardly from the sides of said block joined by said edge whereby a pocket is formed between said rollers to accommodate one of said rods.

References Cited

UNITED STATES PATENTS

| | | | |
|---|---|---|---|
| 2,739,630 | 5/1956 | Rey | 146—7 |
| 3,100,982 | 8/1963 | Cutler | 73—12 |
| 3,190,110 | 6/1965 | Craccraft | 73—12 |
| 3,297,015 | 1/1967 | Crawford | 125—23 |

RICHARD C. QUEISSER, Primary Examiner

J. WHALEN, Assistant Examiner

U.S. Cl. X.R.

73—101; 88—1